Figure 1:
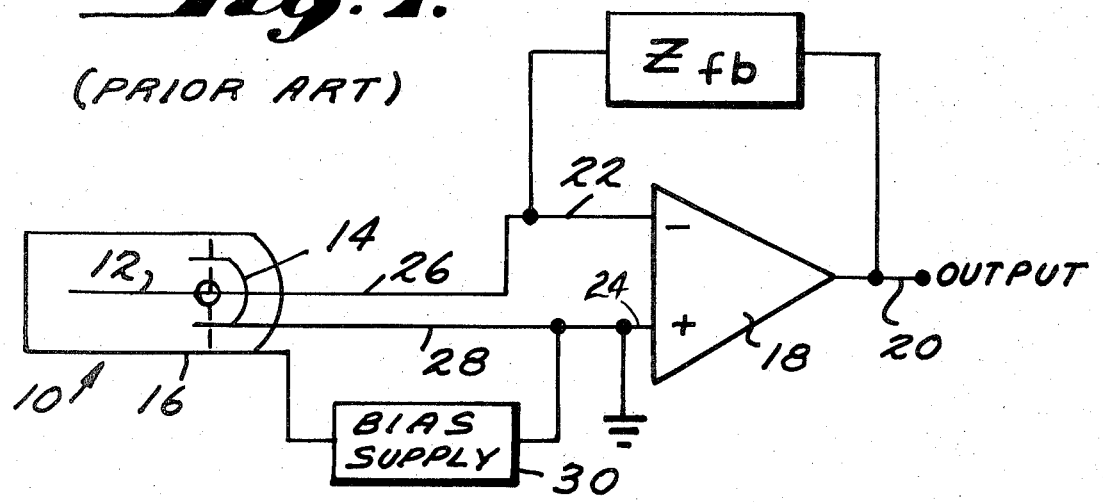

United States Patent [19]
Sunderland

[11] 3,840,745
[45] Oct. 8, 1974

[54] DETECTOR BIAS VOLTAGE CONNECTION

[75] Inventor: John C. Sunderland, Redwood City, Calif.

[73] Assignee: Capintec, Inc., Mount Vernon, N.Y.

[22] Filed: Aug. 16, 1972

[21] Appl. No.: 280,947

[52] U.S. Cl............................. 250/336, 250/374
[51] Int. Cl........................... G01t 1/16, G01t 1/18
[58] Field of Search .......... 250/83.6 R, 83.6 P, 336, 250/374

[56] References Cited
UNITED STATES PATENTS

| | | |
|---|---|---|
| 2,986,636 | 5/1961 | Carlson et al............ 250/83.6 R X |
| 3,287,560 | 11/1966 | Morgan.......................... 250/83.6 R |
| 3,601,612 | 8/1971 | Perez-Mendez................ 250/83.6 R |
| 3,712,983 | 1/1973 | Borkowski et al............. 250/83.6 R |

Primary Examiner—Archie R. Borchelt
Attorney, Agent, or Firm—Fleit, Gipple & Jacobson

[57] ABSTRACT

A detector system having the output referred to ground potential and having a shell conductor of the detector at ground potential. The detector bias supply or voltage source is isolated from ground.

7 Claims, 3 Drawing Figures

DETECTOR BIAS VOLTAGE CONNECTION

This invention relates to detector systems and more particularly to radiation detector systems having a particularly advantageous bias voltage connection.

Many detector systems may be described in terms of three major subsystems, a detector, a bias supply, and an indicator. The association of the detector with the bias supply produces a signal related to the strength of the detectable quantity which is received by the indicator and converted by the indicator into an output representative of the strength of the detectable quantity.

Such detector systems may be illustrated by a radiation detection system comprising an ionization chamber detector, a bias supply (battery), and an electrometer amplifier and (digital) voltmeter indicator.

A number of radiation indicators are presently known. Many of these radiation indicators or detectors are suitable for use with an ionization chamber issuing low current DC signals proportional to the strength of a radioactive source housed within the ionization chamber. Basically, each of these known indicators is adapted to receive low-current signals from the output of an ionization chamber, to amplify such signals and to ultimately develop a visual output which is indicative of the strength of the radioactive source housed within the ionization chamber.

It is also well known that such radiation indicators or detectors commonly use bias supplies or voltage sources to bias the detector. However, the bias voltage connections heretofore used in known detectors and in known radiation indicators have suffered from a number of disadvantages.

Accordingly, it is an object of the present invention to provide a detector system having a bias voltage connection which overcomes the disadvantages inherent in prior art bias voltage connections.

Additional objects and advantages of the present invention will be set forth in part in the description which follows, and in part will be obvious from the description or may be learned by practice of the invention. The objects and advantages are realized and attained by means of the instrumentalities and combinations particularly pointed out in the appended claims.

To achieve these and other objects, the present invention provides a detector system having a radiation detector with a bias supply or voltage source isolated from ground and having the output of the radiation detector referred to ground potential together with the shell conductor of the radiation detector.

As here embodied, this invention provides a detector system comprising a detector having an inner conductor and a shell conductor insulated from the inner conductor, feedback amplifier means in operative relationship with the detector for amplifying electrical signals from the inner conductor, a voltage source or bias supply in circuit between the inner conductor and a first input of the amplifier means, and first grounded conductor means in circuit between the shell conductor and a second input of the amplifier means. This connection configuration is particularly effective if the amplifier means is an operational amplifier and the first input is the inverting input of such amplifier and the second input is the non-inverting input.

In addition, an outer conductor may be located in the detector and in electrically insulated relationship with respect to the inner and shell conductors, and second conductor means may be provided in circuit between the outer conductor and the first input of the amplifier means.

Preferably, one end of the second conductor means is coupled in circuit between the voltage source or bias supply and the first amplifier input and the other end of the second conductor means is coupled to the outer conductor.

Although the detector system described herein will be discussed with particular reference to a radiation detector system utilizing an ionization chamber detector, it should be understood that this invention has applications for other than those systems utilizing ionization chambers. Rather, the detector system of this invention has reference to any detector requiring a bias voltage.

It is also to be understood that both the foregoing general description and the following detailed description are exemplary and explanatory and are not restrictive of the invention.

The accompanying drawings, consisting of FIGS, 1, 2 and 3 which are incorporated in and constitute a part of the specification, illustrate an example of a preferred embodiment of the invention and, together with the description, serve to explain the principles of the invention.

With reference now to the drawings, wherein like reference characters designate like or corresponding parts throughout the several views, there is shown in FIG. 1 a prior art detector bias voltage connection. A radiation detector 10 is shown having an inner conductor or collector electrode 12, an outer conductor or high voltage electrode 14 electrically insulated from inner conductor 12 and a shell conductor 16. The radiation detector or ionization chamber 10 is well known and will not be described in detail herein. It may be, for example, of a type disclosed in U.S. Pat. No. 3,091,716, issued on May 28, 1963.

An operational amplifier 18, having a feedback impedance $Z_{fb}$, has an output 20, an inverting input 22 and a non-inverting input 24. A conductor 26 is coupled in circuit between inner conductor 12 and inverting input 22 of amplifier 18. Another conductor 28 is connected in circuit between outer conductor 14 and non-inverting input 24 of the amplifier. Conductor 28 is also grounded, and a bias supply or voltage source 30 is coupled in circuit between shell conductor 16 and non-inverting input 24 of the amplifier.

The detector bias voltage connection in the detector system illustrated in FIG. 1 is well known, but this arrangement suffers from the disadvantage that shell conductor 16 of detector 10 and the interconnecting cable between the detector and operational amplifier 18, formed by conductors 26 and 28, are operated at the full bias voltage. This, of course, presents a potential shock hazard and may require the use of extensive amounts of insulation.

Figure 2:
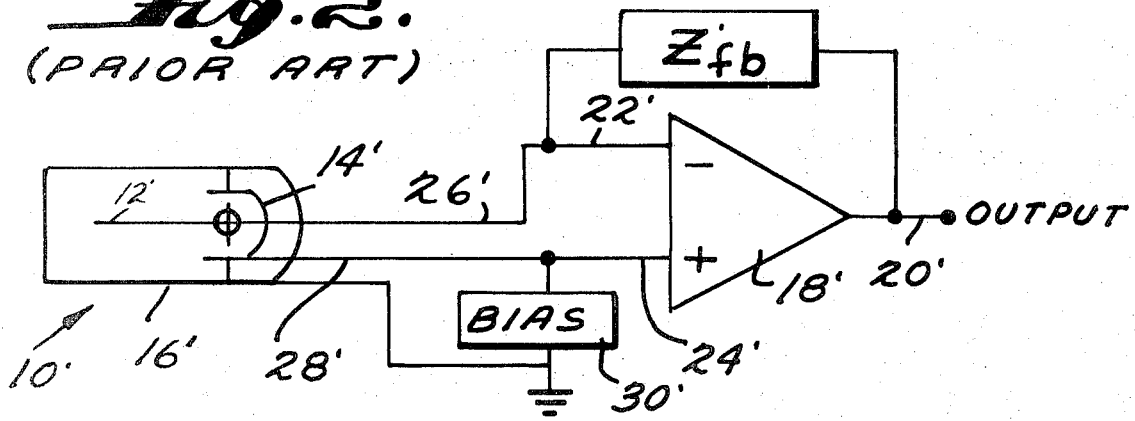

The detector system illustrated in FIG. 2 is also a known configuration. As with the system of FIG. 1, the FIG. 2 system includes an inner conductor 12' insulated from a high voltage conductor 14'. An operational amplifier 18' has an inverting input 22' coupled to inner conductor 12', and the amplifier also has a non-inverting input 24' coupled in circuit with outer conductor 14'. A feedback impedance $Z'_{fb}$ is in circuit with the amplifier and a bias supply or voltage source 30' is connected in circuit between non-inverting input 24' and a shell conductor 16' of the detector.

The system of FIG. 2 has performed satisfactorily in the past, but it has also suffered from several serious disadvantages. For example, the output from the detector system is offset from ground by the voltage of bias supply 30'. This, of course, creates additional circuit complexity whenever the eventual system outputs must be referred to ground potential.

Figure 3:
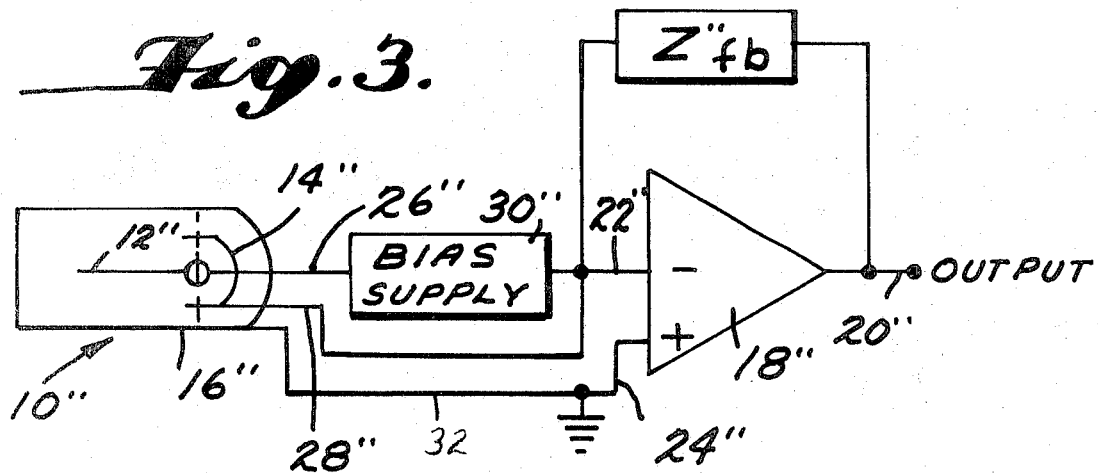

The detector system of this invention is illustrated in FIG. 3 wherein a bias voltage or voltage source configuration is utilized so as to eliminate the disadvantages inherent in the configurations illustrated in FIGS. 1 and 2.

The detector system of this invention comprises a detector 10" having an inner conductor 12" insulated from a shell conductor 16". An operational amplifier 18", having a feedback impedance $Z''_{fb}$, has an inverting input 22" coupled in circuit with a bias supply or voltage source 30' and a non-inverting input 24" connected to a grounded conductor 32. Conductor 32, in turn, is connected to the shell conductor 16" of the detector.

An outer conductor 14" is also provided within detector 10" and in insulated relationship with respect to shell conductor 16" and inner conductor 12". Outer conductor 14" is connected in circuit via conductor 28" to the inverting input 22" of the amplifier 18.

Because of the unique construction of the detector system illustrated in FIG. 3, the disadvantages present in the configurations of FIGS. 1 and 2 are completely eliminated. For example, the output from the inventive system is with reference to ground potential, and the shell conductor 16" of the detector 10" and interconnecting cable 32 are also at ground potential. Bias supply 30" is isolated from ground, and the bias supply may be, for example, a battery or a transformer-operated supply.

As previously stated, the detector 10" need not necessarily be an ionization chamber but may be any detector requiring a bias voltage for operation. Furthermore, although conductor 28" is shown connecting outer conductor 14" to inverting input 22" of the amplifier, the outer conductor 14' may not be required if leakage currents are sufficiently low. If outer conductor 14' is not needed, the requirement for conductor 28" (usually a braided shield which reduces leakage in the cable itself) may also be eliminated.

The present invention, thus provides for an improved detector system having a unique detector bias voltage connection that eliminates disadvantages inherently present in related prior art systems. The invention in its broader aspects is also not limited to the specific details shown and described, and departures may be made from such details without departing from the principles of the invention and without sacrificing its chief advantages.

What is claimed is:

1. In a detector system having a detector with an inner conductor and a shell conductor insulated from said inner conductor, and amplifier means in operative relationship with said detector for amplifying electrical signals from said inner conductor, the improvement comprising a voltage source in circuit between said inner conductor and a first input of said amplifier means, and first grounded conductor means in circuit between said shell conductor and a second input of said amplifier means.

2. In a detector system as in claim 1 further having an outer conductor in insulated relationship with respect to said inner and shell conductors, the improvement comprising second conductor means in circuit between said outer conductor and said first input of said amplifier means.

3. In a detector system as in claim 2, the improvement comprising one end of said second conductor means being coupled in circuit between said voltage source and said first amplifier input and the other end of said second conductor means coupled to said outer conductor.

4. A radiation detector system, comprising:
a detector having an inner conductor and a shell conductor insulated from said inner conductor;
feedback amplifier means in operative relationship with said detector for amplifying electrical signals from said inner conductor;
a voltage source in circuit between said inner conductor and a first input of said amplifier means; and first grounded conductor means in circuit between said shell conductor and a second input of said amplifier means.

5. A radiation detector system as in claim 4 further including an outer conductor in said detector and in electrically insulated relationship with respect to said inner and shell conductors; and
second conductor means in circuit between said outer conductor and said first input of said amplifier means.

6. A radiation detector system as in claim 5 wherein one end of said second conductor means is coupled in circuit between said voltage source and said first amplifier input and the other end of said second conductor means is coupled to said outer conductor.

7. A radiation detector system as in claim 4 wherein said detector is an ionization chamber detector.

* * * * *